United States Patent [19]

Takizawa et al.

[11] Patent Number: 4,758,018
[45] Date of Patent: Jul. 19, 1988

[54] REAR WHEEL SUSPENSION ARRANGEMENT FOR MOTOR VEHICLES

[75] Inventors: Shozo Takizawa, Okazaki; Kazuyoshi Kobayashi, Oobu; Kazuo Fukuyama, Okazaki; Masanori Tani, Okazaki; Shoji Yamamoto, Okazaki; Masayoshi Nishimori, Okazaki; Hiroaki Yoshida, Okazaki; Shinichi Eto, Okazaki, all of Japan

[73] Assignee: Mitsubishi Jidosha Kogyo Kabushiki Kaisha, Tokyo, Japan

[21] Appl. No.: 883,098

[22] Filed: Jul. 8, 1986

[30] Foreign Application Priority Data

| Jul. 15, 1985 | [JP] | Japan | 60-155522 |
| Jul. 15, 1985 | [JP] | Japan | 60-107765[U] |
| Jul. 15, 1985 | [JP] | Japan | 60-107766[U] |
| Jul. 15, 1985 | [JP] | Japan | 60-107767[U] |
| Nov. 1, 1985 | [JP] | Japan | 60-245502 |
| Nov. 8, 1985 | [JP] | Japan | 60-250494 |
| Nov. 8, 1985 | [JP] | Japan | 60-172087[U] |
| Jan. 29, 1986 | [JP] | Japan | 61-17176 |

[51] Int. Cl.⁴ ............................................. B60G 3/28
[52] U.S. Cl. ............................... 280/690; 280/701
[58] Field of Search .............. 280/661, 666, 668, 669, 280/673, 694, 699, 692, 701, 719, 720; 267/19 A, 20 A

[56] References Cited

U.S. PATENT DOCUMENTS 3,893,701 7/1975 Kroniger ..................... 280/690
4,181,322 1/1980 Kroniger ..................... 280/720
4,556,238 12/1985 Matschinsky ............... 280/673

FOREIGN PATENT DOCUMENTS

| 0096345 | 12/1983 | European Pat. Off. |
| 2645272 | 4/1978 | Fed. Rep. of Germany |
| 3119777 | 12/1982 | Fed. Rep. of Germany |
| 0139807 | 8/1983 | Japan ................. 280/690 |

OTHER PUBLICATIONS

*SAE Technical Paper* No. 831045, "Front and Rear Suspension of the New Mercedes Model WZ01", 6/83.

Primary Examiner—John J. Love
Assistant Examiner—Karin L. Ferriter
Attorney, Agent, or Firm—Hedman, Gibson, Costigan & Hoare

[57] ABSTRACT

A rear wheel suspension arrangement of trailing arm type for motor vehicles includes a trailing arm for supporting a rear wheel, and a pair of upper and lower lateral arms. The trailing arm is split into a vehicle body side arm and a wheel side arm, which are coupled to have a degree of displacing freedoms within a horizontal plane of the vehicle body. The vehicle body side arm is formed shorter than the lateral arms, whose pivotally securing portion to the vehicle body is disposed at the front side from the coupling portion to the wheel side arm, and disposed in the inside in the lateral direction from the wheel side arm. The lower lateral arm is pivotally secured at least to the wheel side arm via a ball joint.

8 Claims, 11 Drawing Sheets

F I G. 4
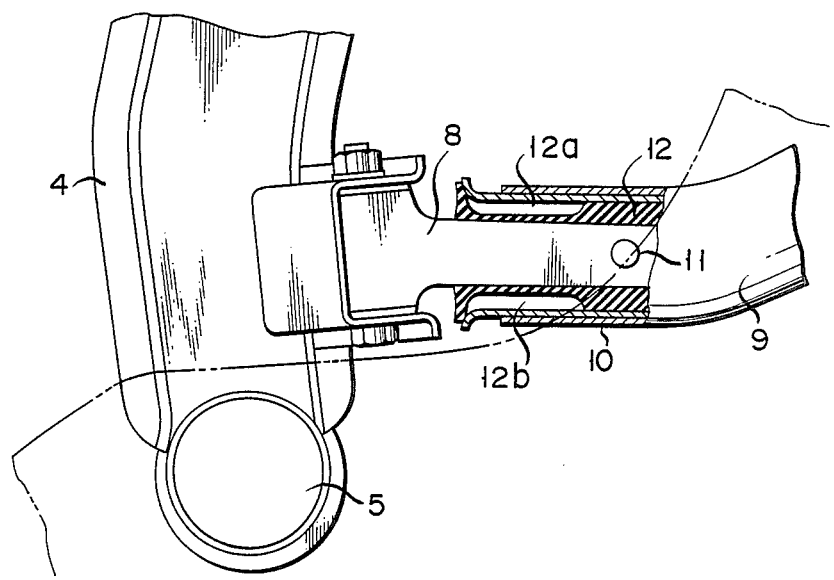
F I G. 5
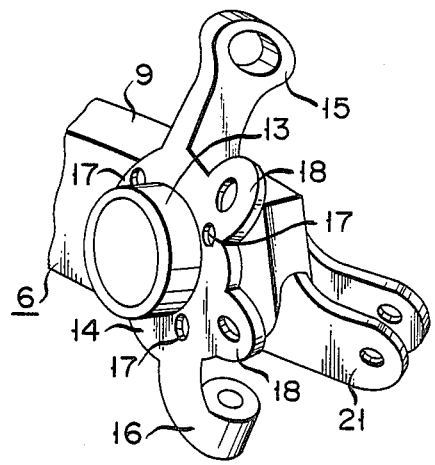

REAR WHEEL SUSPENSION ARRANGEMENT FOR MOTOR VEHICLES

BACKGROUND OF THE INVENTION

The present invention relates to a rear wheel suspension arrangement for motor vehicles.

A prior art rear wheel suspension arrangement is disclosed in U.S. Pat. No. 4,181,322, British Patent No. 1,545,393, West German Patent No. 2,645,272 and French Patent No. 2,366,947, all equivalent. The rear wheel suspension arrangement has, as shown in FIG. 1, longitudinal stay 01 (a front link arm) connected at one end side thereof with a vehicle body side and mounted at the other end side thereof at a wheel side, and lateral stay 02 (a rear link arm) rotatably mounted at one end side thereof at the rear position from stay 01 at the body side and at the other end side thereof at the wheel side. Stay 02 is formed, for example, of a resilient member such as a leaf spring. Rotatable bearing 012 is interposed between stay 01 and the body side, rotatably mounted at one end side thereof at the body side, and hingedly coupled between the other end side of bearing 012 and stay 01 through a pin for forming a vertical bearing axis. In this case, cylindrical sleeve 017 is formed at stay 01, and a bushing formed of a resilient material is interposed between sleeve 017 and bearing 012. Further, the bushing is provided with recesses which extend in the horizontal direction. Though not shown in the drawings, wheel support member 09, which itself is supported by stay 01, is further provided with another lateral stay which is arranged above stay 02 to be positioned between wheel support member 09 and the vehicle body. Wheel support member 09 is supported by the above-written another lateral stay at its upper portion and by stay 01 at its lower portion.

When a brake force Br is acted on a rear wheel, a reaction reverse to the traveling direction is acted on stay 01, bearing 012 is pressed by the reaction toward the inside at the pin for forming an axis of rotation as a center, and as bearing 012 rotates, a rear wheel is rotated in a toe-in direction through the longitudinal stay to compensate for the displacement of the toe-out direction acted on the rear wheel by the brake force. In this case, the toe of the rear wheel is varied in response to the deflection of stay 01 formed of a leaf spring, and stay 02 is disposed at its normal position in the state that the leaf spring is not deformed.

However, since the lateral stay is, for example, formed of a resilient member such as a leaf spring in the conventional rear wheel suspension arrangement, there arises a problem that the thickness of the leaf spring cannot be reduced in thickness due to the buckling strength of the lateral stay. Thus, since the thickness of the leaf spring of the lateral stay tends to increase, the leaf spring is hardly resiliently deformed. Such drawbacks exist that, when the leaf spring of stay 02 is elastically deformed, a relatively large force is necessary and merely a small amount of toe-in operation can be obtained. In other words, since the rear wheel does not exert the toe-in change if a relatively large brake force is not acted, a desired toe-in change cannot be obtained in case of cornering while lightly braking or while engine braking. In this case, there tends to be an oversteer condition, thereby resulting in loss of automotive traveling stability.

Further, since the conventional rear wheel suspension arrangement is provided with still another lateral stay, not shown, for supporting wheel support member 09 above stay 02, when stay 02, made of a leaf spring, is deformed, stay 01, for supporting member 09 below, displaces toward the inside of the vehicle body so that member 09 tilts in the outside of the body to cause a camber-variation, thereby resulting in a difficulty due to an increase in the camber angle with respect to the ground surface. Therefore, the vehicle is effected by a large lateral force when rapidly turning at a corner, so that, when stay 02 is deformed at the outer wheel side at the turning time, the increase in the camber angle with respect to the ground surface is aided, with the result that the ground contacting area of the wheel at the outer wheel side at the turning time which must produce larger ground contacting force decreases, thereby resulting in a difficulty due to a decrease in the cornering limit of the vehicle.

If the above-mentioned rear wheel suspension arrangement is not precisely balanced in the spring constants of stays 02, shapes and spring constants of bushings, and the shapes, sizes and dispositions of stays, the aforementioned difficulties cannot be suppressed to ranges so as not to lose the utility, and there arise drawbacks of a number of designing inconveniences as well as a complicated construction, necessity of accurate machining and an expensive cost.

In the conventional rear wheel suspension arrangement, the momentary central point O of the suspension disposed at the crossing point between the extension line of bearing 012 and the extension line of the lateral stay displaced forward at a distance l with respect to the axle of the rear wheel as shown in FIG. 1, when a lateral force F is applied to the rear wheel of outer wheel side toward the inside of the vehicle at the vehicle body turning time, the bushings of the suspension are resiliently deformed by the moment around the momentary central point O, so that the rear wheel displaces toward the toe-out direction with the result that there arises a drawback that the vehicle tends to be oversteered.

SUMMARY OF THE INVENTION

It is an object of the present invention to provide a rear wheel suspension arrangement which can restrict the toe-change or toe-out when a forward force and outward force are applied to a vehicle body to prevent the vehicle from being oversteered and which can provide a toe-in when the backward and inward forces are applied, thereby improving the steering stability, safety, and riding feeling.

In an aspect of the present invention, there is provided a rear wheel suspension arrangement comprising a trailing arm for supporting a rear wheel, upper and lower lateral arms pivotally secured at the outer end thereof to the rear portion of the trailing arm and pivotally secured at the inner end thereof to a vehicle body side, and a ball joint. The trailing arm is split into a vehicle body side arm formed shorter than said two lateral arms, pivotally secured at one ends to the vehicle body side, disposed at the other end thereof forward with respect to the one end thereof, disposed into a wheel side arm having the degree of freedom of displacement within the horizontal plane of the vehicle body, coupled at the front end thereof with the other end of the vehicle body side arm, and pivotally secured at the rear portion thereof to said two lateral arms for supporting said rear wheel. The vehicle body side arm is disposed in the inside of said wheel side arm in the lateral direction of the vehicle, and at least the lower lateral arm pivotally is secured to said wheel side arm via the ball joint.

BRIEF DESCRIPTION OF THE DRAWINGS

FIG. 4 is a sectional view of the essential portion showing the coupled state of a vehicle body side arm and a wheel side arm of a trailing arm;

FIG. 5 is a perspective view showing the rear end of the trailing arm;

DETAILED DESCRIPTION OF THE PREFERRED EMBODIMENTS

A first embodiment of a rear wheel suspension arrangement according to the present invention will be described in detail with reference to the accompanying drawings.

Figure 1:
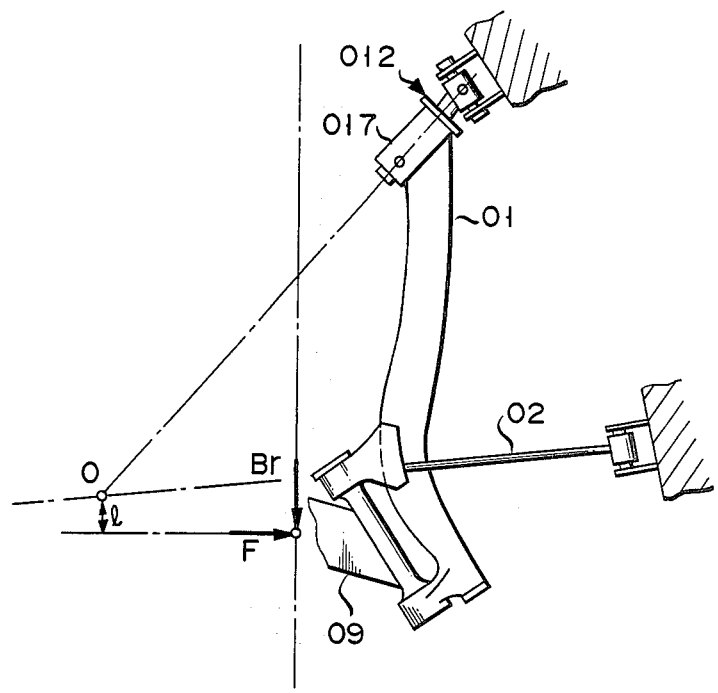
FIG. 1 is a plan view of a conventional rear wheel suspension arrangement.
Figure 2:
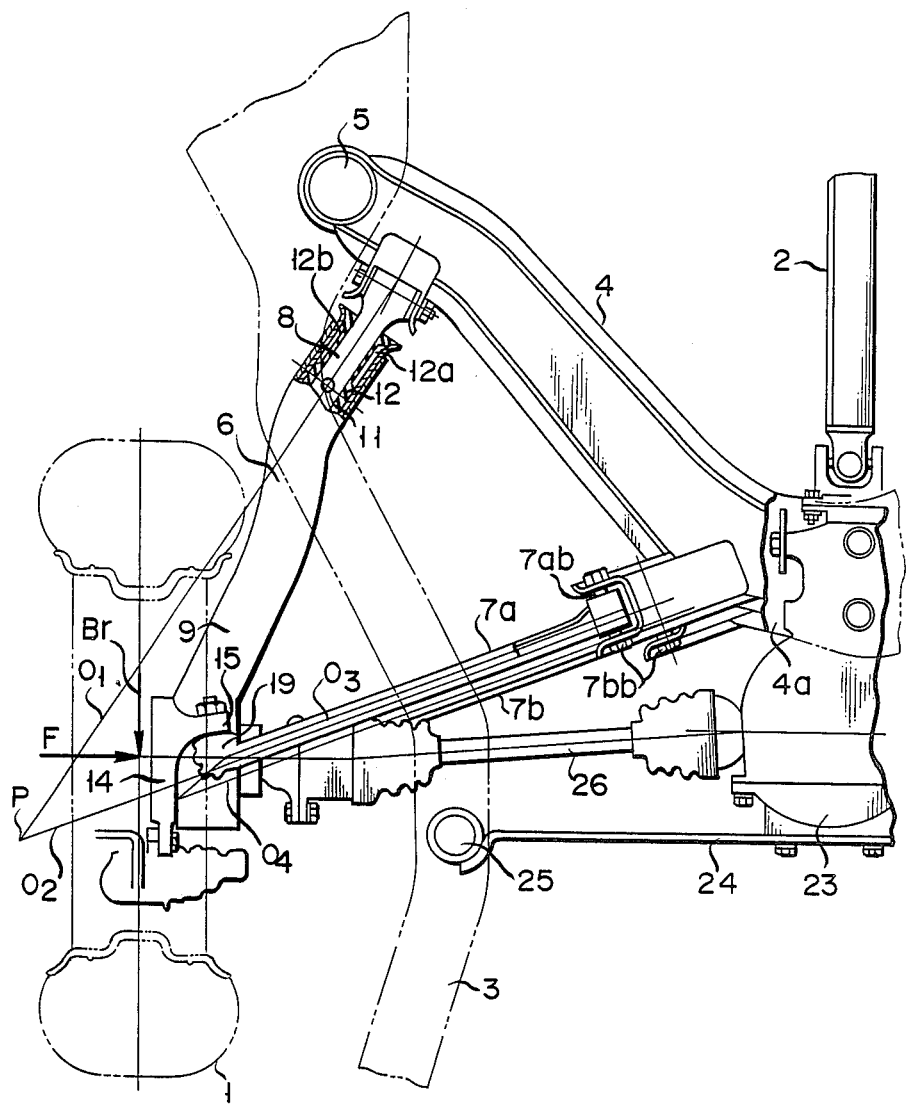
FIG. 2 is a plan view showing the construction of a first embodiment of a rear wheel suspension arrangement according to the present invention.
Figure 3:
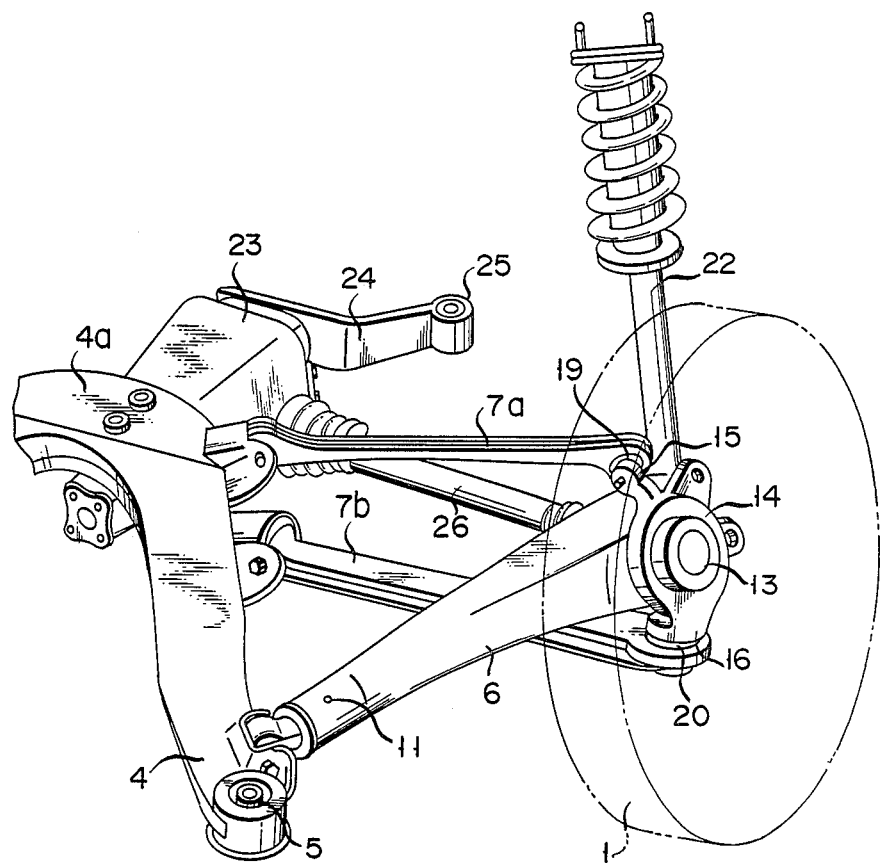
FIG. 3 is a perspective view of the arrangement shown in FIG. 2.

FIGS. 2 and 3 show a schematic construction of the essential portion of a rear wheel suspension arrangement. Numeral 1 designates a rear wheel, numeral 2 a propeller shaft of a vehicle body side, numeral 3 body frames, and numeral 4 a suspension cross member. Member 4 is disposed along the lateral direction of the vehicle, and mounted hingedly between a pair of body frames 3 disposed at the right and left sides of the vehicle body.

Further, cross member 4 is bent in the state that the central portion side is bent to the vehicle body rear side. In this case, member 4 is mounted at body frame 3 side through cross member bushing 5 formed of a resilient material.

Numeral 6 designates a trailing arm for supporting rear wheel 1, and 7a and 7b a pair of upper and lower lateral arms also referred to herein as (upper link 7a and lower link 7b). Arm 6 is split into additional link (vehicle body side arm) 8, pivotally secured to the vehicle body side, and trailing link (wheel side arm) 9, connected to the rear wheel 1 side. In this case, link 8 is disposed in the lateral inside of the vehicle with respect to link 9, and is formed shorter than the lateral arms (upper link 7a and lower link 7b).

Moreover, link 9 is formed at the front end thereof with hollow cylinder 10 as shown in FIG. 4, and the front end side of rod-shaped link 8 is inserted into cylinder 10. The base end side of link 8 is resiliently and pivotally secured to member 4 through a bushing formed of a resilient material.

Further, rotary shaft 11 is mounted in a penetrated manner between the front end side of link 8 and cylinder 10 of link 9. The axis of shaft 11 extends substantially in the vertical direction, and the front end side of link 8 and cylinder 10 of link 9 are rotatably connected therebetween with shaft 11 as a center. Further, bushing 12 formed of a resilient material is interposed between cylinder 10 of link 9 and the front end side of link 8. A pair of recesses 12a and 12b are formed on both sides of bushing 12 in the horizontal surface, and as bushing 12 deforms, link 9 and link 8 can relatively rotate with shaft 11 as a center. Thus, link 8 is coupled with link 9 allowing freedom of displacement in the horizontal plane of the vehicle body.

Furthermore, essentially cylindrical axle housing 13 and hub carrier 14 engaged with the outer periphery of housing 13 are integrally fixed to the rear end of link 9 as shown in FIG. 5. In this case, housing 13 is welded to the rear end of link 9, and then machined at the inner and outer peripheral surfaces. Thus, the engaging portions of the inner peripheral side of housing 13 with hub carrier 14 of outer peripheral side are precisely formed by the machining. Further, upper support 15 for pivotally securing upper link 7a of the lateral arms is formed on the upper portion of hub carrier 14, and lower support 16 for pivotally securing link 7b of the lateral arms is formed on the lower portion of hub carrier 14. In this case, hub carrier 14 is welded to the rear end of link 9 in the state externally engaged with housing 13. Hub carrier 14 is formed with mounting holes 17 for mounting a brake drum at the brake drum mounting time and with mounting bracket 18 for mounting a caliper at disk brake mounting time.

Moreover, the outer end of upper link 7a of the lateral arms is pivotally secured to upper support 15 of hub carrier 14 through ball joint 19, and the inner end is resiliently pivotally secured to the vicinity of rear projection 4a of the end of the bent portion of suspension cross member 4 of the vehicle body side through a bushing formed of a resilient material. Link 7b of the lateral arms is also pivotally secured essentially similarly to link 7a at the outer end thereof to the lower support 16 of hub carrier 14 through ball joint 20, and is resiliently pivotally secured at the inner end thereof to the vicinity of rear projection 4a of the end of the bent portion of member 4 of vehicle body side through a bushing formed of a resilient material. In this case, the coupling portion between upper link 7a and lower link 7b of the lateral arms and member 4 of the vehicle body side is disposed at the front side of the vehicle body from the coupling portion of the links 7a and 7b of the lateral arms and link 9 side.

Figure 6:
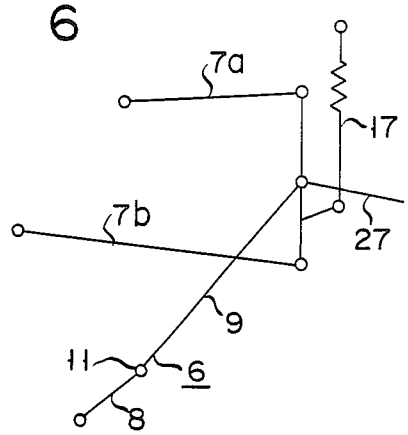
FIG. 6 is a simulated view showing the coupling state of links.
Figure 7:
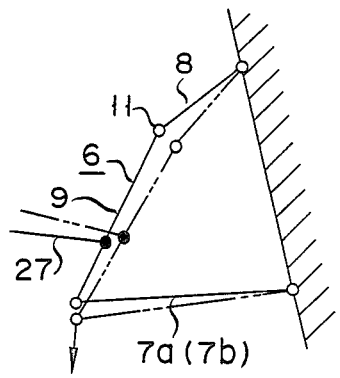
FIG. 7 is a plan view of the linkage shown in FIG. 6.

Linkage of quadric crank chain as shown in FIGS. 6 and 7 is composed of link 8 and link 9 of arm 6, and the lateral arms (upper link 7a and lower link 7b). Further, the coupling portion of link 7a of the lateral arms and link 9 side is disposed at the forward side of the vehicle body from the coupling portion of link 7b and link 9 side, and is disposed in the inside of the lateral direction of the vehicle.

Further, strut bracket 21 is formed, as shown in FIG. 5, at the rear end of link 9, and the lower end of suspension strut 22 (FIG. 3) is connected directly to bracket 21.

On the other hand, as shown in FIG. 3, differential unit 23 is mounted at rear projection 4a of the end of the bent portion of member 4. Unit 23 is supported at the rear end thereof by differential support member 24 mounted hingedly between right and left body frames 3. Further, member 24 is resiliently connected to frame 3 side through differential support member bushing 25 formed of a resilient material. Numeral 26 designates drive shaft, and numeral 27 wheel spindle of the rear wheel.

In the arrangement described above, since the linkage of the quadric crank chain for exerting the toe-change of the rear wheel by moving the position of spindle 27 of the rear wheel as link 9 and link 8 is relatively rotated with shaft 11 for connecting between link 8 and link 9 of arm 6 as a center and is composed of link 8 of arm 6 and the lateral arms (upper link 7a and lower link 7b) as shown in FIGS. 6 and 7, when a backward force is, for example, acted on the rear wheel like at braking time, link 9 and link 8 relatively rotate therebetween with shaft 11 as a center by the backward force, and the links are deformed from the normal position, designated by the solid lines in FIG. 7, to the toe-in position, designated by imaginary lines in FIG. 7, upon the relative rotation to exert the toe-change of the rear wheel.

Since links 7a and 7b of the lateral arms and hub carrier 14 integrally fixed to link 9 are respectively pivotally secured via joints 19 and 20, even if lateral force F is acted on the rear wheel at vehicle cornering time, no resilient displacement occurs between hub carrier 14 for supporting the rear wheel and the lateral arms, but only the bushings provided between member 4 and links 7a, 7b slightly deflect, and no large difference takes place in the deformations of the upper and lower bushings. Therefore, no camber change to increase the camber angle with respect to the ground surface occurs from the result of the displacement of the vicinity of the ground contacting portion of the rear wheel by the lateral force at the vehicle cornering time in the relative inside of the vehicle body, and the camber angle with respect to the ground surface can be held at a small value, even with the vehicle's abrupt cornering time, to thus exert excellent cornering performance. Since the lateral force at the cornering time acts on the rear wheel from the ground contacting surface, the above-mentioned performance is effectively performed by pivotally securing link 7b, nearer to the road surface, to hub carrier 14 via joint 20. In some cases, link 7a and hub carrier 14 may be journaled through a bushing.

Further, the operation of the above-mentioned quadric links may be smoothened by using ball joints 19 and 20 to provide the effective toe-in operation. Moreover, since the coupling portion of links 7a and 7b of the lateral arms and member 4 of vehicle body side is disposed forward of the vehicle body from the coupling portion of links 7a and 7b of the lateral arms and link 9 side, the momentary central point P of the suspension arm formed of the crossing point of the center line $O_1$ of link 8 of arm 6 and the center line (the center line between the central line $O_3$ of link 7a and the central line $O_4$ of link 7b) $O_2$ of the lateral arms is disposed in the rear side of the axle and in the outside of the lateral direction of the vehicle from the center of the wheel as shown in FIG. 2. Thus, if a lateral force is acted, for example, from the outward direction to the rear wheel of the outer wheel side as designated by an arrow F in FIG. 2 at the vehicle body cornering time, link 9 and link 8 are relatively rotated therebetween at shaft 11 as a center by the action of the moment around the point P acting by lateral force F to deform the link upon the rotation, thereby exerting the toe-in effect at the rear wheel of the outer wheel side and effecting the lateral force to the rear wheel of the inner wheel side from the inward direction. In this case, since the toe-out effect is exerted to the rear wheel of the inner wheel side, the right and left rear wheels can be displaced in the same direction as the cornering direction of the vehicle to effectively generate the understeering trend of the vehicle at the vehicle body cornering time. Consequently, the cornering performance and the safety of the vehicle at the vehicle body cornering time can be improved. Even if the backward force Br is acted on the rear wheel at decelerating time, the links are operated upon by the action of the moment around the momentary central point P to more effectively obtain the toe-in effect.

Figure 8:
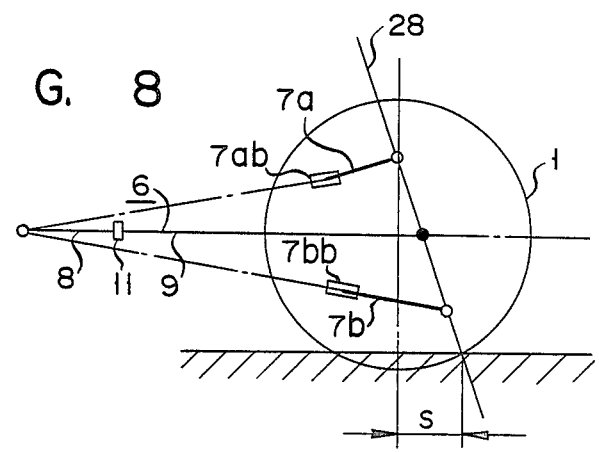
FIG. 8 is a side view of the linkage shown in FIG. 6.
Figure 9:
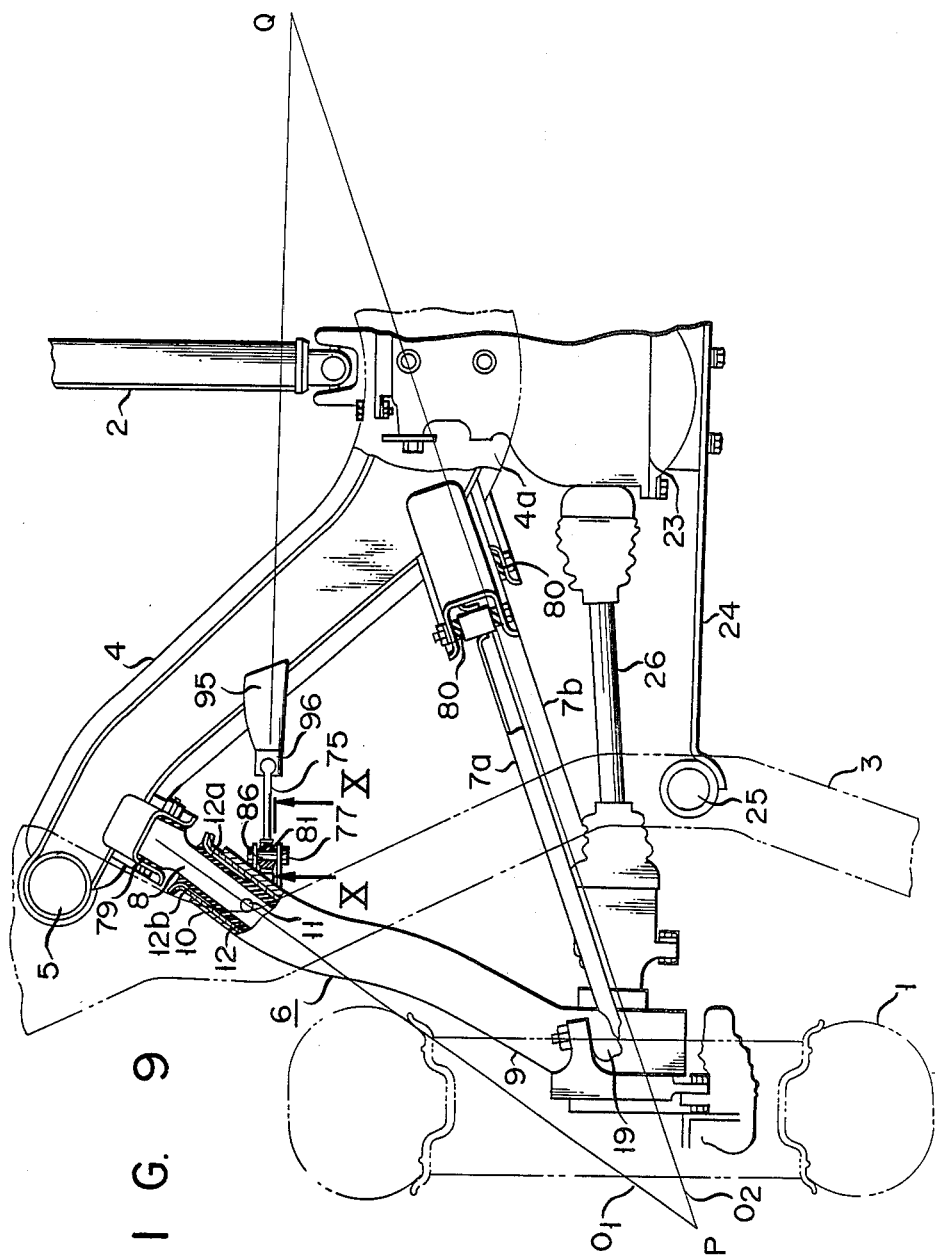
FIG. 9 is a plan view showing a second embodiment of a rear wheel suspension arrangement according to the present invention.

Further, since the coupling portion of upper link 7a of the lateral arms and lower link 9 side is disposed in the front side of the vehicle body and in the inside of the lateral direction of the vehicle from the coupling portion of link 7b and link 9 side, imaginary king pin axis (an axis directed toward the direction along the line for connecting between the coupling portion of link 7a of the lateral arms and link 9 side and the coupling portion between link 7b of the lateral arms and link 9 side) 28 for supporting the wheel as shown in FIG. 8 can be held in the forwardly tilted state. Further, when the forward force is acted on the vehicle body like at normal traveling time, the inward moment for operating the toe-in effect at the rear wheel can be generated around axis 28 to apply the toe-in effect to the rear wheel. In addition, as shown in FIG. 8, the direction of the pivotally securing axis of body side pivotally securing portions 7ab, 7bb, of links 7a, 7b of the lateral arms becomes the direction for connecting the vehicle body side pivotally securing axis of link 8 and the vehicle body side pivotally securing axis of links 7a, 7b in the plane as seen from the side of the vehicle body. Thus, the upward and downward displacements of the lateral links may be smoothly performed, and the suspension arrangement may be smoothly moved in upward and downward strokes.

Since the direction of the pivotally securing axis of the vehicle body side pivotally securing portions 7ab, 7bb of the lateral arms has an angle with respect to the direction for connecting the pivotally securing portions 7ab, 7bb and the vehicle body side pivotally securing point of link 8 as shown in FIG. 2 in the horizontal plane of the vehicle body, the lateral force acting at the turning time can be dispersed into axial and radial directions and supported, thereby providing excellent strength and dependency of the pivotally securing portions.

Since the lower end of strut 22 is connected directly to bracket 21, provided at link 9 for supporting the rear wheel through hub carrier 14, the calking deformations of the bushings in the upward and downward strokes of the suspension can be reduced to smoothly achieve the upward and downward strokes of the suspension. Further, since the coupling portion of link 7a of the lateral arms and member 4 of the vehicle body side is disposed at the front side of the vehicle body from the coupling portion of links 7a, 7b and link 9 side and links 7a, 7b of the lateral arms are disposed obliquely with respect to the lateral direction of the vehicle, the momentary central point P can be readily set to the rear side of the rear wheel axle and to the outward of the lateral direction of the vehicle of the center of the rear wheel, and the entire size of the entire rear wheel suspension arrangement can be reduced as compared with the case that they are disposed in the lateral direction of the vehicle.

Furthermore, since member 4 is resiliently supported to body frame 3 side through bushing 5 formed of a resilient material, the base end side of link 8 of arm 6 is resiliently pivotally secured to member 4 through the bushing formed of a resilient material and the inner ends of links 7a, 7b of the lateral arms are resiliently pivotally secured to member 4 of the vehicle body side through the bushings formed of a resilient material, the vibration of the rear wheel can be attenuated by the bushings between links 7a, 7b of the lateral arms and member 4 and between arm 6 and member 4 during the traveling of the vehicle, and then attenuated by bushing 5 between member 4 and frame 3 side. Thus, since double vibration preventing effect can be provided between the rear wheel side and the vehicle body side, the vibration of the rear wheel side is adapted to be hardly transmitted to the vehicle body side during the traveling of the vehicle, thereby improving the riding feeling of the vehicle. Further, since the rear wheel suspension arrangement can be mounted on member 4 before mounting member 4 at frame 3 side, the workability of assembling the vehicle body side can be improved.

Further, since differential unit 23 is mounted at rear projection 4a of the end of the bent portion bent at the rear side of the vehicle body at the central position of member 4, the weight of member 4 can be increased. Thus, the intrinsic vibration frequency of member 4 can be reduced, and the vibration preventing effect of the rear wheel side during the traveling of the vehicle can be further enhanced. Further, since bushing 5 may use a relatively hard resilient material by increasing the weight of member 4, the durability of bushing 5 can be improved, and so-called "compliance steering," which exhibits the oversteering trend due to the displacement of the rear wheel in the direction reverse to the cornering direction of the vehicle, which in turn is due to the resilient deformation of a resilient member such as bushing 5 disposed between the rear wheel side and the vehicle body side by a lateral force acted at the rear wheel side at the vehicle body cornering time, can be reduced, thereby improving the cornering performance and the safety of the vehicle at the cornering time. Moreover, since the central portion side of member 4 is bent to the rear side of the vehicle body, the workability of mounting unit 23 at rear projection 4a of the end of the bent portion of member 4 can be improved.

Further, since housing 13 is engaged and welded to the rear end of timing link 9 and the inner and outer peripheral surfaces of housing 13 are then machined, the welding distortion of housing 13 occurring at welding time can be removed by the machining. Thus, the engaging portion of the bearing of housing 13 at the inner peripheral side and hub carrier 14 of the outer peripheral side can be accurately formed by the machining. Since hub carrier 14 is externally engaged with housing 13, positioned and welded to the rear end of link 9 in this state, the assembling accuracy of supports 15 and 16 for supporting the outer ends of links 7a, 7b of the lateral arms can be enhanced. Further, the workability of assembling the support of shaft 26 can be enhanced as compared with the conventional suspension arrangement.

According to the first embodiment of the present invention as described above, the rear wheel can be effectively exerted in the toe-in effect to rear force Br acted on the rear wheel and lateral force F acted inward on the vehicle body, thereby improving the traveling stability of the vehicle. Since the toe-in operation can be obtained by the actions of the moments around the linkage of the quadric crank chain and the momentary central point P and the moment around imaginary king pin axis 28 as described above, the rear wheel can be exerted in the toe-in effect in a wider traveling state than the conventional vehicle, the toe-in amount can be increased as compared with the conventional vehicle, sensitive toe-in operations can be provided, and the steering characteristic of the vehicle at the cornering time can be held in the understeering state to improve the traveling stability and the safety of the vehicle.

Further, the camber angle of the rear wheel with respect to the ground surface can be held at a small value at the vehicle cornering time, thereby improving the cornering performance of the vehicle as compared with the conventional vehicle.

In addition, since the inner ends of the lateral arms are disposed at the front side of the vehicle body from the outer ends of the lateral arms, excellent space-saving effect can be provided as compared with the conventional vehicle.

Moreover, since the vehicle body side arm and a pair of upper and lower lateral arms are resiliently supported to member 4 resiliently supported to the vehicle body, a double vibration preventing system can be utilized to improve the riding feeling of the vehicle and the assembling work can be simplified, thereby improving the workability.

Furthermore, since differential unit 23 is supported to member 4, the workability of assembling can be improved, and the intrinsic vibration frequency at the periphery of member 4 is reduced to enable the use of bushings having high spring constants, thereby suppressing the compliance steering phenomenon.

Since strut 22 is supported directly to the wheel side arm and the direction of the pivotally securing axis of the vehicle body side of the lateral arms is disposed in the direction for connecting the vehicle body side pivotally securing point of the vehicle body side arm and the lateral arms vehicle body side pivotally securing point in the plane as seen from the side of the vehicle body, smooth upward and downward strokes can be obtained.

Additionally, since housing 13, engaged and welded to the rear end of the wheel side arm and then mechanically cut at the inner and outer peripheral surfaces, is provided and hub carrier 14, having a support for supporting the lateral arms, externally engaged with housing 13 and welded to the wheel side arm, is provided, the workability of assembling the support of the rear wheel axle is thereby enhanced, and the manufacturing and assembling accuracy of components is improved.

Moreover, according to the first embodiment described above, the rear wheel suspension arrangement has a simple and rational construction as compared with the conventional suspension arrangement, thereby providing an excellent space-saving and excellent designing property.

FIGS. 9 to 13 show a second embodiment of the present invention, wherein the same reference numerals as in the first embodiment denote the same parts in the second embodiment, and the detailed description thereof will be omitted. Bracket 77 is fixed to the vicinity of rotary shaft 11 of a trailing link 9, and the outer end of control arm 75 is pivotally secured to bracket 77 through bushing 81. Arm 75 is disposed at its axis directed toward the lateral direction of the vehicle, and crossing point Q between the extension line of the central axis of arm 75 and the extension line of the central axis of the lateral arms is disposed in the inside of the lateral direction from the center of the rear wheel. The inner end of arm 75 is connected directly to bracket 95 fixed to cross member 4 through ball joint 96.

Figure 10:
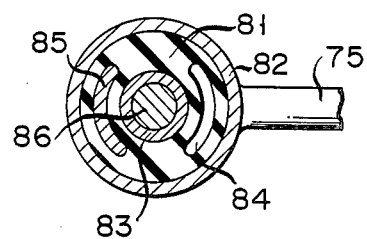
FIG. 10 is a sectional view of a bushing taken along the line X—X with arrows in FIG. 9.
Figure 11:
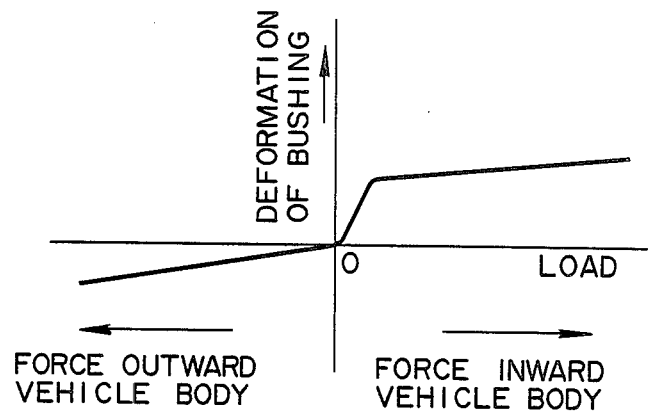
FIG. 11 is a graph showing the characteristic curve of a bushing.

Bushing 81 interposed between arm 75 and link 9 has a construction as shown in FIG. 10. Bushing 81 is provided at arm 75 in such a manner that, while bushing 81 is fit in outer cylinder 82 formed at the outer end of arm 75, it receives inside of it an inner cylindrical collar 83 which in turn encircles pivotal shaft 86 mounted at bracket 77. The portions disposed in the inside of bushing 81, in the lateral direction of the vehicle are partially cut out to form cavities 84 therein, and steel insert 85 is engaged within the cavity disposed in the outside of bushing 81 in the lateral direction of the vehicle. Thus, bushing 81 has a small spring constant for a force directed in the inward direction of the vehicle body acting on pivotal shaft 86 and a large spring constant for a force directed in the outward direction of the vehicle body. In other words, the characteristic between the load applied to bushing 81 and the deformation of bushing 81 is as shown in FIG. 11. Thus, bushing 81 allows arm 6 to displace inward of the vicinity of shaft 11 in the lateral direction of the vehicle and restricts arm 6 to displace outward of the vicinity of shaft 11 in the lateral direction of the vehicle.

On the other hand, bushing 79, interposed between additional link 8 and cross member 4, has a spring constant set larger than that of bushing 81 at cavity 84 side and smaller than that of bushing 81 at steel insert 85 side. This spring constant is set so that the vicinity of shaft 11 of arm 6 may displace to the vehicle side in the axial direction of link 8. A pair of bushings 80 interposed between a pair of upper and lower lateral arms 7a, 7b and cross member 4 have resilience sufficiently larger than bushing 79.

Figure 12:
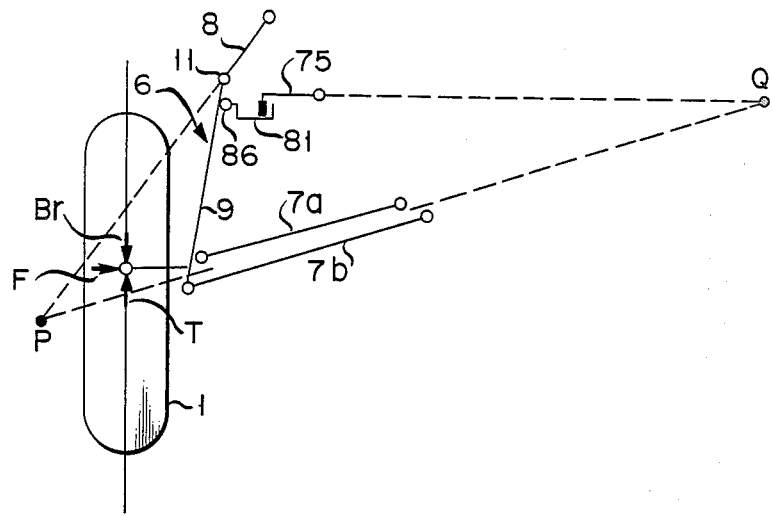
FIG. 12 is a diagram showing the coupled state of links.

The rear wheel suspension arrangement of the second embodiment is schematically shown in FIG. 12.

The operation of the second embodiment will be described in detail.

When brake force Br or lateral force F is acted on rear wheel 1, the vicinity of rotary shaft 11 of arm 6 displaces by the operation of the moment around momentary central point P, and rear wheel 1 is exerted in toe-in effect in the same manner as the first embodiment. Since the displacement of the vicinity of shaft 11 of arm 6 in the inward direction of the vehicle body at this time is absorbed by the displacement of bushing 81 toward cavity 84 side, the toe-in operation of rear wheel 1 is not disturbed by control arm 75, and the toe-in operation of rear wheel 1 is provided for brake force Br and lateral force F in the same manner as the first embodiment. Further, when forward force T is acted by the drive force to rear wheel 1 at vehicle starting and accelerating time, the vicinity of shaft 11 of arm 6 is displaced in the outward direction in the lateral direction of the vehicle by the operation of the moment around momentary central point P so that rear wheel 1 tends to exert toe-out operation, but the vicinity of shaft 11 of arm 6 is connected directly to the vehicle body side by arm 75, and since bushing 81 operates to restrict the displacement of the vicinity of shaft 11 in the outward direction of the vehicle by insert 85, the toe-out of rear wheel 1 is disturbed. Then, a reaction of the force for exerting toe-out operation of rear wheel 1 is strongly acted on arm 75 by the operation of the moment around central point P at this time. As a result, arm 75 is effected by tensile force. Thus, arm 75 performs a function as one of suspension arms for controlling the operation of rear wheel 1, and crossing point Q, between the operating line of arm 75 and the center line of arms 7a, 7b, acts as a simulated momentary central point. Since point Q is disposed inward in the lateral direction of the vehicle from the central axis of rear wheel 1, rear wheel 1 exerts toe-in operation by the operation of the moment around the simulated momentary central point Q. Since the displacement of the vicinity of shaft 11 of arm 6 to the vehicle body side in the axial direction of link 8 is absorbed by the deformation of bushing 79, the above-mentioned toe-in operation is not disturbed by the presence of link 8, nor does an interference of links occur between link 8 and arm 75.

In the second embodiment described above, not only the same advantages as the first embodiment will be obtained, but also a rear suspension arrangement, which varies the momentary central point of its suspension action between the case that brake force Br or lateral force F acts on the rear wheel and the case that drive force T acts on the rear wheel, will be provided. Further, the toe-in operation for drive force T is remarkably improved as compared with the first embodiment which utilizes only the inward moment around the king pin axis.

Figure 13:
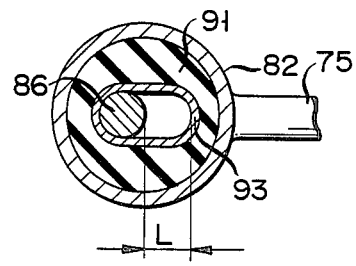
FIG. 13 is a sectional view of a modified bushing similar to that shown in FIG. 10.

The present invention is not limited to the particular embodiments as described above. Various changes and modifications may be made within the spirit and scope of the present invention. For example, inner cylindrical collar 93 having a long hole may be formed in bushing 91 as shown in FIG. 13. In this case, pivotal shaft 86 provided at arm 6 side is disposed outward of collar 93 of the lateral direction of the vehicle at normal operation time of the suspension to displace only in the inward direction of the vehicle body of the vicinity of shaft 11 of arm 6 by an initial clearance L provided in the inward direction in the lateral direction of the vehicle.

Figure 14:
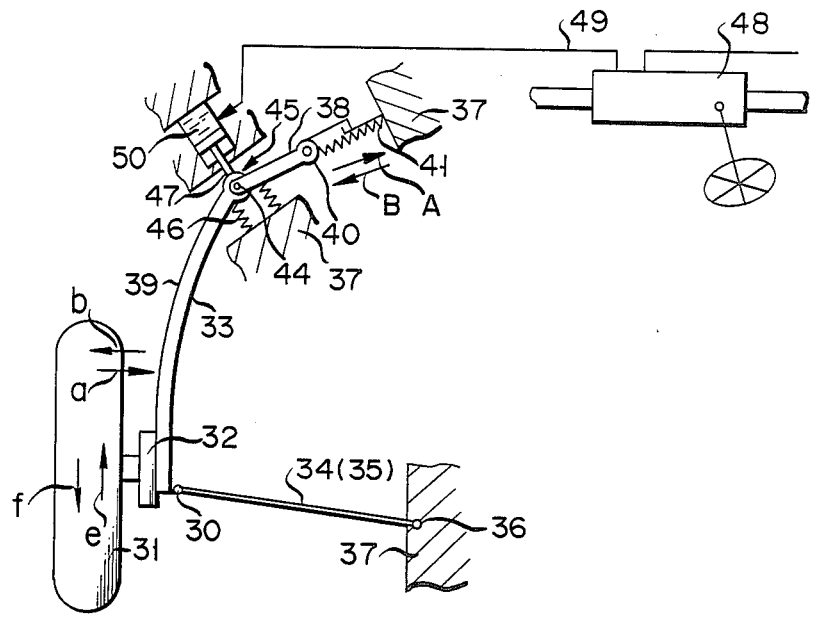
FIG. 14 is a schematic plan view of a third embodiment of a rear wheel suspension arrangement according to the invention.
Figure 15:
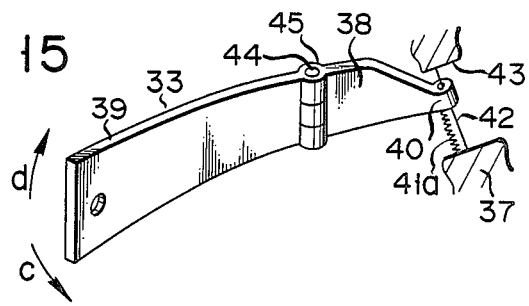
FIG. 15 is a perspective view of a trailing arm of the third embodiment.
Figure 16:
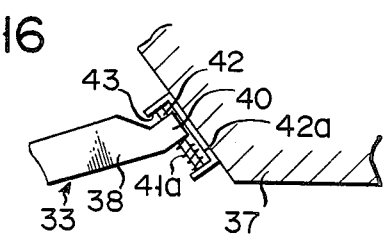
FIG. 16 is a longitudinal sectional front view showing the vehicle body mounting portion of the trailing arm of the third embodiment.

FIGS. 14 to 16 show a third embodiment of the present invention. FIGS. 14 and 15 show the schematic construction of a trailing arm type rear wheel suspension arrangement according to the present invention. Numeral 31 designates a rear wheel, mounted on hub carrier 32. Hub carrier 32 is fixed to trailing arm 33 to be described in detail later. Trailing arm 33 is supported by a pair of upper and lower lateral arms 34 and 35 (only one of which is shown) extending essentially in the lateral direction of the vehicle at the rear side of wheel 31. The outer ends of arms 34, 35 are pivotally secured to arm 33 via ball joint 30, and the inner ends are rotatably supported to vehicle body 37 through bushing 36 in the same manner as the conventional rear wheel suspension arrangement. Arm 33 is split into vehicle body side arm 38 formed shorter than arms 34, 35 and wheel side arm 39 supported to arms 34, 35 for supporting wheel 31.

Arm 38 has at one end thereof annular portion 40 to become a vehicle side mounting portion, and bushing 41 is provided in annular portion 40. In other words, arm 38 is supported to body 37 through bushing 41, which has, as schematically shown in FIG. 14, a spring constant smaller for lateral force "a" inward of the vehicle body, and larger for lateral force "b" outward of the vehicle body.

Furthermore, support shaft 42 of bushing 41a is attached through bracket 42a to body 37 in such a manner that support shaft 42 is vertically arranged and inclined with respect to body 37 and that the upper portion of support shaft 42 faces the outer surface of body 37, as schematically shown in FIGS. 15 and 16. Bushing 41a is fit in axially slidable manner on support shaft 42. Moreover, stopper 43 for restricting the upward movement of annular portion 40 of arm 38 is provided at the upper end side of shaft 42, and at the lower end side, as shown in FIG. 16, with annular portion 40 movable downward by the resilience of flange 41a formed at the lower portion of annular portion 40 formed integrally with bushing 41. Thus, annular portion 40 can move toward the inside in the lateral direction of the vehicle due to the radial deformation of bushing 41 for inward lateral force "a" and downward force "c" and can also move toward downward direction along shaft 42 due to compressing deformation of flange 41a of bushing 41, and the movement toward the outside in the lateral direction of the vehicle and the upward movement along shaft 42 are restricted by the fact that the radial deformation of bushing 41 for outward lateral force "b" and upward force "d" is small, and by stopper 43.

When the suspension strokes in the extending side, i.e., downward force "c" is acted, annular portion 40 moves downward along shaft 42 to move inward in the lateral direction of the vehicle as described above, but when the suspension strokes in the contracting stroke, i.e., upward force "d" is acted, annular portion 40 contacts stopper 43 to restrict the outward movement in the lateral direction of the vehicle, so that wheel 31 is restricted so as not to exert the toe-out operation.

On the other hand, wheel side arm 39 is rotatably connected to the other end of vehicle body side arm 38, supported at one end thereof to body 37 via pivotal shaft 44 having axial center in the vertical direction. Thus, arm 38 is connected to arm 39 with a degree of displacing freedom in the horizontal plane. Arms 38 and 39 are so disposed that the angle formed between arms 38 and 39 in the horizontal plane is obtuse (more than 90°) at body 37 side, and arm 38 is disposed on the inside in the lateral direction of the vehicle from arm 39.

Further, the insides of both arms 38, 39 at pivotally securing portions are supported to body 37 through bushing 36, and stopper 47 for restricting the movement of arm 39 toward the direction for reducing the above-mentioned angle is formed at body 37 in the outside. In other words, stopper 47 communicates with a power steering mechanism 48 through a hydraulic circuit 49, and the stopping position can be adjusted by rear wheel steering actuator 50 hydraulically projected or retracted.

The operation of the third embodiment of the trailing arm type rear wheel suspension arrangement will be described in detail.

When forward force "e" is acted on wheel 31, arm 33 tends to move forward, but pivotally securing portion 45 of arm 39 contacts stopper 47 to restrict the movement. Accordingly, the toe-change, i.e., toe-out occurred at wheel 32 supported through carrier 3 to arm 39 can be restricted.

Even if outward lateral force "b" is produced at body 37 in case of cornering the vehicle so that arm 33 tends to move outside, pivotally securing portion 45 of arm 39 contacts stopper 47 to restrict the movement of arm 39. Therefore, the toe-out of wheel 31 can be restricted. Further, in this case, the projecting amount of stopper 47 can be varied by regulating hydraulic pressure of power steering mechanism 48 acting on actuator 50 through hydraulic circuit 49, thereby arbitrarily regulating the stopping position.

Further, when a brake force is applied to the vehicle, backward force "f" is produced at body 37, in this case, pivotally securing portion 45 of arms 38, 39 of arm 33 compresses bushing 46 by the operation of the quadric links formed of arms 38, 39 and links 34, 35 to move toward body 37 side, thereby exerting the toe-in effect at wheel 31.

Since arm 38 of arm 33 is mounted on body 37 through flexible bushing 41 inward of the vehicle body, when inward force "a" is applied at the wheel position, arm 33 moves inward the vehicle body by the fact that the outward displacement of pivotally securing portion 45 of arm 33 is restricted by stopper 47 and that bushing 41 is deformed larger than bushing 36, and wheel 31 is exerted in toe-in operation, thereby preventing the vehicle from oversteering at cornering time.

Therefore, the toe-out of wheel 31 can be restricted due to forward force "e" of the vehicle body and lateral force "b" out of the vehicle body, and wheel 31 is exerted in toe-in effect by backward force "f" of the vehicle body and lateral force a inward of the vehicle body. Further, when downward force "c" is applied by the extending stroke of the suspension, annular portion 40 of arm 38 moves along shaft 42 inward of the lateral direction of the vehicle and downward to shift the toe-out trend toward the toe-in direction, thereby holding neutral, while when upward force "d" is applied, annular portion 40 contacts stopper 43 to restrict the toe-variation.

Further, since links 34, 35 are pivotally secured to arm 39 via ball joint 30, a chamber-change does not occur at wheel 31 by the operation of lateral forces "a", "b" at cornering time in the same manner as the first embodiment, but the camber angle with respect to the ground surface can be held small.

According to the third embodiment described above, since the camber angle with respect to the ground surface can be held small at vehicle cornering time in the same manner as the first embodiment, excellent cornering performance of the vehicle can be provided. Since stopper 47 for restricting the movements or arms 38, 39 in the direction for reducing the angle formed therebetween is provided, the toe-out produced when forward force "e" of the vehicle body and outward lateral force "b" are applied can be restricted, the toe-in operation is provided for the backward force "f" and inward lateral force "a", thereby improving the stability in the cornering and braking time.

Further, shaft 42 of arm 38 extends vertically and is located near the vehicle body. In addition, the upper portion of shaft 42 is inclined toward the outside of the vehicle body. The portion of trailing arm 33 coupled to the vehicle body is thereby allowed to move downward. Thus, when the suspension is in an extending stroke, the trailing arm 33 moves laterally inwardly of the vehicle body so that wheel 31 does not move into a toe-out position, but rather into a neutral or toe-in position. Therefore, the traveling stability of the vehicle is improved.

FIGS. 17 to 20 show a fourth embodiment of the present invention.

Figure 17:
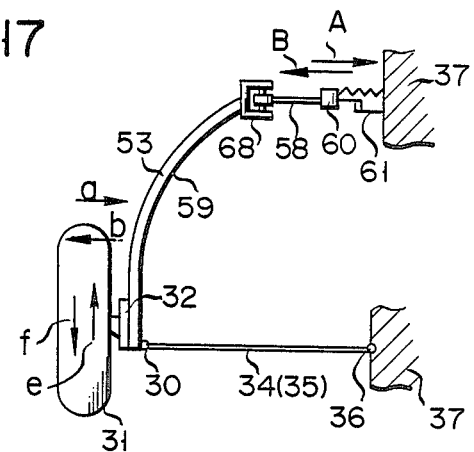
FIG. 17 is a simulated plan view showing a fourth embodiment of a rear wheel suspension arrangement according to the invention.
Figure 18:
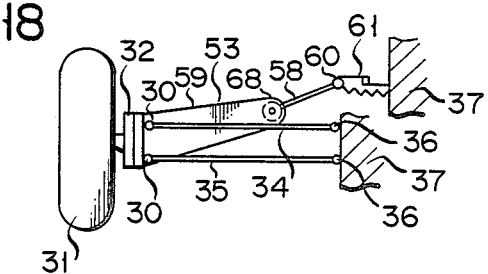
FIG. 18 is a back view of the fourth embodiment.

FIGS. 17 and 18 show schematic construction of a trailing arm type rear wheel suspension arrangement according to the present invention. Trailing arm 53 supports wheel 31 through hub carrier 32, and the rear of wheel 31 is supported to a pair of upper and lower lateral arms 34 and 35 through ball joint 30.

Figure 19:
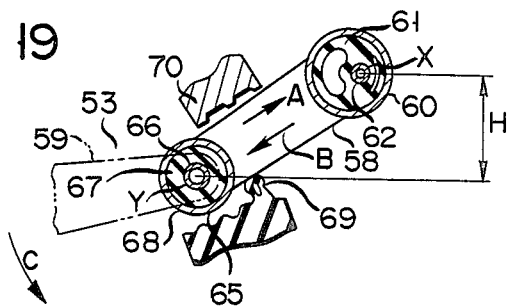
FIG. 19 is a longitudinal sectional view of the coupled portion of the trailing arm of the fourth embodiment.
Figure 20:
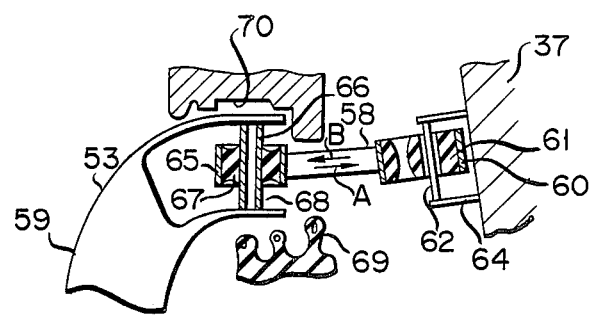
FIG. 20 is a horizontal sectional view of the trailing arm of the fourth embodiment.

Arm 53 is split into vehicle body side arm 58 formed shorter than arms 34, 35, and wheel side arm 59 supported to arms 34, 35 for supporting wheel 31. Arm 58 has at one end thereof an annular portion 60 to become a vehicle body side mounting portion, and bushing 61 is provided in mounting portion 60. In other words, arm 58 is supported to vehicle body 37 through bushing 61, which has a punched hole formed radially as shown in FIG. 19 of a size varied between the inside and the outside of the vehicle body to provide a spring constant smaller for inward lateral force "a" of the vehicle body and larger for outward lateral force "b". Further, vehicle body side mounting shaft 62 of arm 53 is mounted, as shown in FIGS. 19 and 20, longitudinally with respect to body 37 so that the front side is directed toward the outside of the vehicle body via bracket 64 in such a manner that bushing 61 is axially movably engaged with shaft 62 in a range of bracket 64.

On the other hand, annular portion 65 is also formed at the other end of arm 58 supported at one end thereof to body 37, and bushing 67 having connecting shaft 66 is engaged at the center thereof with annular portion 65. Shaft 66 is mounted essentially in the longitudinal directions of the vehicle as an axial center, and the ends of arm 59 are connected to both ends of shaft 66. Thus, arms 58, 59 are resiliently connected by bushing 67, and arms 58, 59 are connected with a degree of displacing freedom in a horizontal plane. Arms 58, 59 are so disposed that the angle formed therebetween in the horizontal plane becomes an obtuse angle (more than 90°) in the inward direction of body 37, and arm 58 is disposed in the inside of lateral direction of the vehicle from arm 59. Further, a resilient stopper 69 is provided from inside lower portion to the rear portion of coupling portion 68 of both arms 58, 59, and rigid stopper 70 is provided from the outside upper portion to the forward portion.

Further, arm 58 is mounted at the position lower by the size H at the connecting point Y of arm 59 from supporting point X to body 37.

The operation of the fourth embodiment of the trailing arm type rear wheel suspension arrangement will be described in detail.

When forward force "e" is acted on wheel 31 at accelerating time, arm 53 tends to move forward, but coupling portion 68 of arm 59 contacts stopper 70 to restrict the movement. Accordingly, toe-change, i.e., toe-out produced at wheel 31 supported to arm 59 through hub carrier 32 can be restricted.

Even if outward force "b" is produced at body 37 so that arm 53 tends to move in the outside in case of the cornering of the vehicle, coupling portion 68 of arm 59 contacts stopper 70 to restrict the movement of arm 59, and since the vehicle body side mounting portion of arm 53 is provided with bushing 61, having a large spring constant for outward force "b" of the vehicle body, the toe-out of wheel 31 can be restricted.

Further, backward force "f" is produced at body 37 at decelerating time such as when a brake force is applied to the vehicle. In this case, coupling portion 68 of arm 58 of arm 53 and arm 59 extends within the resilient range of bushing 67 by the operation of the linkage of the quadric crank chain formed of arms 58, 59 and arms 34, 35, and the angle formed between arms 58 and 59 increases. Accordingly, wheel 31 exerts the toe-in operation. Simultaneously, since shaft 62 for supporting arm 58 is displaced at the front portion thereof toward the outside of the vehicle body, arm 58 moves backward along shaft 62 by backward force "f" to displace inward the vehicle body, thereby effectively exerting the toe-in operation.

Moreover, since arm 59 of arm 53 is mounted at body 37 through flexible bushing 62 in the inward direction of the vehicle body, when lateral force "a" is inwardly applied to wheel 31 at the vehicle cornering time, arm 53 moves inward of the vehicle body so that wheel 31 exerts in the toe-in effect to restrict the toe-out operation, thereby preventing the vehicle from oversteering at the cornering time.

Therefore, the toe-out of wheel 31 by forward force "e" of the vehicle body and outward lateral force "b" of the vehicle body can be restricted, and wheel 31 exerts the toe-in operation by backward force "f" and inward lateral force "a". Further, when downward force "c" is applied by the extending stroke of the suspension, since coupling portion Y of arm 58 to arm 59 is disposed at the position lower than supporting point X to body 37, coupling portion 68 of arms 58 and 58 moves inward by the compressing stopper 69 to move the toe-out trend to the toe-in direction, thereby holding neutral.

According to the fourth embodiment described above, since a pair of arms 34, 35 are pivotally secured to arm 59 via ball joint 30 in the same manner as the first to third embodiments, the camber angle with respect to the ground surface is held small at the vehicle cornering time to provide excellent cornering performance, and wheel 31 can be exerted in the toe-in operation at the vehicle decelerating time by the operation of the linkage of quadric the crank chain formed of arms 58, 59 and arms 34, 35, thereby improving the traveling stability of the vehicle.

Since arms 58, 59 are resiliently coupled essentially in the longitudinal directions as an axial center and arm 58 is disposed at the coupling point of arm 39 at the position lower than the supporting point to body 37, wheel 31 can be exerted in toe-in operation by inwardly displacing the front portion of arm 59 at extending stroke time of the suspension, thereby providing excellent traveling stability of the vehicle.

Further, since arm 53 is displaced inward of the vehicle body when the inward force is applied to wheel 31 by the operation of bushing 61 provided at the vehicle body mounting portion of arm 58, wheel 31 is exerted in the toe-in direction at cornering time to obtain the understeering characteristic, thereby improving the traveling stability of the vehicle.

The present invention is not limited to the first to fourth embodiments. For example, only the lower lateral arms may be pivotally secured to the wheel side arm via a ball joint. Further, various other changes and modifications may be made within the spirit and scope of the present invention.

According to the present invention as described together with the embodiments, the linkage of the quadric crank chain is formed of the vehicle body side arm and the wheel side arm, and the lateral arms, and when the rear wheel is effected by a backward force by the operation of the links at the vehicle decelerating time, the rear wheel is exerted in the toe-in operation. Since the vehicle body side arm is exerted in the toe-in effect by the operation of the links shorter than the lateral arms and disposed in the inward direction in the lateral direction of the vehicle from the wheel side arm, the toe-in operation can be provided by the backward force smaller than the conventional one, the toe-in amount can be increased as compared with the conventional vehicle to effectively generate an understeering trend, thereby further improving the traveling stability of the vehicle.

Further, since at least the lower lateral arm is pivotally secured to the wheel side arm via the ball joint, the resilient deformation of the link at the side of the lower lateral arm acting with large lateral force input from the road surface to the rear wheel at the vehicle cornering time can be remarkably reduced to hold the camber angle with respect to the ground surface even at the vehicle's abrupt cornering time by reducing the camber-change of the rear wheel by the lateral force, thereby improving the cornering performance of the vehicle.

Moreover, the above-mentioned advantages can be provided without requiring huge designing difficulties. This rear wheel suspension arrangement has a simple, rational, inexpensive construction, and provides excellent traveling stability. Further, since the momentary central point of the suspension can be disposed at the position rear and outside from the center of the rear wheel, when inward lateral force or backward force is acted on the rear wheel, effective toe-in operation can be provided by the operation of the moment around the momentary central point, thereby improving the traveling stability of the vehicle. Since the rear wheel of outer wheel side is exerted in the toe-in operation by the inward lateral force particularly at the vehicle cornering time, the rear wheel of the inner wheel side is effected by the outward lateral force to exert the toe-out operation. Thus, the right and left rear wheels can be displaced in the cornering direction of the vehicle to hold the steering characteristic during the cornering of the vehicle effectively under steering state, thereby providing excellent stability and safety.

Further, according to the fourth embodiment, the rear wheel suspension arrangement which can provide smooth upward and downward strokes can be provided.

What is claimed is:

1. A rear wheel suspension system comprising:
   a trailing arm having a rear portion for rotatably supporting a shaft of a rear wheel;
   upper and lower lateral arms having lateral outward end pivotally coupled to the rear portion of the trailing arm through a ball joint, and lateral inward ends pivotally coupled to the vehicle body,
   said trailing arm including a first arm having front and rear ends, said front end pivotally coupled to the vehicle body, and a second arm having front and rear ends, said rear end coupled to the shaft of the rear wheel, said first arm being shorter than said lateral arms,
   the rear end of said second arm being pivotally coupled to said lateral arms for rotatably supporting the shaft of the rear wheel,
   the front end of said second arm being pivotally coupled to the rear end of said first arm, at a location rearward of the front end of said first arm, said pivotally coupled portion of said first and second arms having a pivot axis extending substantially vertically of said first and second arms; and
   a control arm having a lateral outward end pivotally coupled to said trailing arm at a portion adjacent to said pivotally coupled portion of said first and second arms, and having a lateral inward end pivotally coupled to the vehicle body,
   said trailing arm and the lateral arms being arranged such that a line passing through the axis of said first arm and a line passing through the center line of the lateral arms cross in a plane of the vehicle body at a location laterally outward of th center of the rear wheel, and that a line passing through the axis of the control arm and a line passing through the centerline of the lateral arms cross at a location laterally inward of the center of the rear wheel in the plane of the vehicle body,
   wherein said pivotally coupled portion of the laterally outward end of said control arm permits lateral inward displacement, and regulates lateral outward displacement.

2. A rear wheel suspension system comprising:
   a trailing arm having a rear portion for rotatably supporting a shaft of a rear wheel;
   upper and lower lateral arms having a lateral outward ends pivotally coupled to the rear portion of said trailing arm through a ball joint, and lateral inward ends pivotally coupled to the vehicle body,
   said trailing arm including a first are having front and rear ends, said front end pivotally coupled to the vehicle body, and a second arm having front and rear ends, said rear end coupled to the shaft of the rear wheel, said first arm being shorter than said lateral arms,
   the rear end of said second arm being pivotally coupled to said lateral arms for rotatably supporting the shaft of the rear wheel,
   the front end of said second arm being pivotally coupled to the rear end of said first arm and forming an angle therebetween, at a location rearward of the front end of said first arm, said pivotally coupled portion of said first and second arms having a pivot axis extending substantially vertically of said first and second arms; and
   a stopper member having one end contacting the trailing arm, and another end connected to the vehicle body,
   said stopper member thereby regulating displacement of the trailing arm in the direction of reducing the angle formed laterally inwardly said first arm and said second arm.

3. A rear wheel suspension system comprising:
   a trailing arm having a rear portion for rotatably supporting a shaft of a rear wheel; and
   upper and lower lateral arms having a lateral outward ends povitally coupled to the rear portion of the trailing arm through a ball joint, and lateral inward ends pivotally coupled to the vehicle body, said trailing arm including a first arm having front and rear ends, said front end pivotally coupled to the vehicle body, and a second arm having front and rear ends, said rear end coupled to the shaft of the rear wheel, said first arm being shorter than said lateral arms, the rear end of said second arm being pivotally coupled to said lateral arms, for rotatably supporting the shaft of the rear wheel, the front end of said second arm pivotally coupled to the rear end of said first arm, at a location rearward of the front end of said first arm, said pivotally coupled portion of said first and second arms having a pivot axis extending substantially vertically of said first and second arms, said pivotally coupled portion at the front end of said first arm having a pivot axis extending substantially vertically and inclining toward the lateral outside of the vehicle body, and whereby said pivotally coupled portion at the front end of said first arm permits downward displacement of the front end of said first arm and regulates upward displacement of the front end of said first arm.

4. A rear wheel suspension system, comprising:
a trailing arm for rotatably supporting a rear axle; and
upper and lower lateral arms having lateral outward ends pivotally coupled to a rear portion of the trailing arm through a ball joint, and lateral inward ends pivotally coupled to a vehicle body, the two lateral arms being slanted in a plane of the vehicle body such that the lateral outward ends thereof are located rearward of the lateral inward ends thereof, the trailing arm including first and second arms, the first arm being shorter than the two lateral arms and having a lateral inward end pivotally coupled to the vehicle body, the second arm having a front end pivotally coupled to a lateral outward end of the first arm at a location rearward of the lateral inward end of the first arm, the pivotally coupled portion of the first and second arms having a pivot axis extending substantially vertically, the second arm further having, at a rear end thereof, a pivotally coupled portion at which the lateral arms are pivotally coupled and a support portion at which the rear axle is rotatably supported, and each of the arms being arranged such that a line passing through the centers of the pivotally coupled portions at the ends of the first arm and a line passing through the centers of the lateral arms intersect each other in the plane of the vehicle body at a location rearward of the rear axle and laterally outward of the center of the rear wheels.

5. The rear wheel suspension system according to claim 4, wherein the inward ends of said lateral arms are located forwardly of the outward ends of said lateral arms, said rear wheel suspension system further comprising a cross member having a middle portion curved toward the rear of the vehicle body, the front end of said first arm and the inner end of said lateral arm being pivotally coupled to said cross member.

6. A rear wheel suspension system, comprising:
a trailing arm for rotatably supporting a rear axle; and
upper and lower lateral arms having lateral outward ends pivotally coupled to a rear portion of the trailing arm through a ball joint, and lateral inward end pivotally coupled to a vehicle body, the trailing arm including first and second arms, the first arm being shorter than the two lateral arms and having a lateral inward end pivotally coupled to the vehicle body, the second arm having a front end pivotally coupled to a lateral outward end of the first arm at a location rearward of the lateral inward end of the first arm, the pivotally coupled portion of the first and second arms having a pivot axis extending substantially vertically, the second arm further having, at a rear end thereof, a pivotally coupled portion at which the lateral arms are pivotally coupled and a support portion at which the rear axle is rotatably supported, and each of the arms being arranged such that a kingpin axis passing between the centers of the two ball joints is slanted toward the front of the vehicle, with the intersection between the kingpin axis and the ground being located rearward of a point at which the rear wheel contacts the ground.

7. A rear wheel suspension system, comprising:
a trailing arm for rotatably supporting a rear axle; and
upper and lower lateral arms having lateral outward ends pivotally coupled to a rear portion of the trailing arm through a ball joint, and lateral inward ends pivotally coupled to a vehicle body, the trailing arm including first and second arms, the first arm being shorter than the two lateral arms and having a lateral inward end pivotally coupled to the vehicle body, the second arm having a front end pivotally coupled to a lateral outward end of the first arm at a location rearward of the lateral inward end of the first arm, the pivotally coupled portion of the first and second arms havign a pivot axis extending substantially vertically, the second arm further having, at a rear end thereof, a pivotally coupled portion at which the lateral arms are pivotally coupled and a support portion at which the rear axle is rotatably supported.

wherein an axis of the pivotal coupling of the inward ends of each of the lateral arms is aligned with a line passing the center of the pivotally coupling at the inward ends of each of said lateral arms and the center of the pivotal coupling of the front end of the first arm in a side view.

8. A rear wheel suspsension system comprising:
a trailing arm having a rear portion for rotatably supporting a shaft of a rear wheel,
upper and lower lateral arms having lateral outward ends pivotally coupled to the rear portion of the trailing arm through a ball joint, and lateral inward end pivotally coupled to the vehicle body, said trailing arm including a first arm having front and rear ends, said front end pivotally coupled to the vehicle body, and a second arm having front and rear ends, said rear end coupled to the shaft of the rear wheel to provide rotatable support for the shaft of the rear wheel, wherein said first arm is shorter than said lateral arms, the rear end of said second arm being pivotally coupled to said lateral arms for rotatably supporting the shaft of the rear wheel, the front end of said second arm being pivotally coupled to the rear end of the said first arm, at a location rearward of the front end of said first arm, said pivotally coupled portion of said first and second arms having a pivot axis extending substantially vertically of said first and second arms, said trailing arm and lateral arms being arranged such that a line passing through the axis of said first arm and a line passing through the centerline of the lateral arms cross in a plane of the vehicle body at a location rearward of the shaft of the rear wheel and laterally outward fo the center of the rear wheel, and a suspension strut directly supported by said second arm, and wherein an axis of the piovtal coupling of the inward ends of said lateral arms is aligned with a line passing the center of the pivotal coupling at the inward ends of each of said lateral arms and the center of the pivotal coupling of the front end of said first arm in a side view.

* * * * *